(12) United States Patent
O'Neil

(10) Patent No.: US 8,952,646 B2
(45) Date of Patent: Feb. 10, 2015

(54) STEPPER MOTOR PHASE FAILURE DETECTION

(75) Inventor: John M. O'Neil, Litchfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 245 days.

(21) Appl. No.: 13/617,966

(22) Filed: Sep. 14, 2012

(65) Prior Publication Data

US 2014/0077748 A1    Mar. 20, 2014

(51) Int. Cl.
*H02P 8/00*    (2006.01)

(52) U.S. Cl.
USPC ........................................ 318/696; 318/685

(58) Field of Classification Search
USPC .................................. 318/696, 685, 599, 811
See application file for complete search history.

(56) References Cited

U.S. PATENT DOCUMENTS

| | | | | |
|---|---|---|---|---|
| 4,460,282 A | * | 7/1984 | Kanno | 368/157 |
| 5,247,217 A | * | 9/1993 | Binnewies et al. | 310/49.01 |
| 5,757,596 A | * | 5/1998 | Weber et al. | 361/23 |
| 6,499,305 B2 | * | 12/2002 | Pham et al. | 62/126 |
| 2002/0178737 A1 | * | 12/2002 | Pham et al. | 62/126 |

* cited by examiner

*Primary Examiner* — Rina Duda
(74) *Attorney, Agent, or Firm* — Cantor Colburn LLP

(57) ABSTRACT

Embodiments are directed to a stepper motor and a controller, where the controller measures a parameter associated with a current of the stepper motor prior to support of commanding a step in connection with the stepper motor. That is, the controller commands the step in connection with the stepper motor, measures a parameter subsequent to commanding the step, compares the measurements of the parameter, and determines whether a fault exists with respect to the stepper motor based on the comparison of the measurements.

20 Claims, 3 Drawing Sheets

STEPPER MOTOR PHASE FAILURE DETECTION

BACKGROUND

A motor is an important component of an aircraft (e.g., an airplane). A motor, however, may fail. For example, a motor may fail due to an open circuit or stall condition, which may result in an inability to move the motor.

One type of motor used in aircraft is a so called stepper motor. A stepper motor is controlled by an external control circuit, such as a microcontroller. To make the motor shaft turn, first, one electromagnet is given power, which makes the rotor magnetically attracted to the electromagnet's poles. When the next electromagnet is turned on and the first is turned off, the rotor rotates slightly to align with the poles of the next one, and from there the process is repeated. Each of those slight rotations is called a "step" and is made upon the issuance of a step command by the control circuit.

Detection of a failed stepper motor is typically based on a position tracking function. Using position tracking results in a delay from a time of the failure until a time that the failure is detected. Moreover, the fault may go undetected until a reposition command (e.g. the next "step command") is provided.

BRIEF SUMMARY

In some embodiments, a system comprises a stepper motor, and a controller configured to: measure a parameter associated with a current of the stepper motor prior to commanding a step in connection with the stepper motor, command the step in connection with the stepper motor, measure the parameter subsequent to commanding the step, compare the measurements of the parameter, and determine whether a fault exists with respect to the stepper motor based on the comparison of the measurements.

In some embodiments, a method comprises measuring, by a controller, a parameter associated with a current of a stepper motor prior to commanding a step in connection with the stepper motor, commanding, by the controller, the step in connection with the stepper motor, measuring, by the controller, the parameter subsequent to commanding the step, comparing, by the controller, the measurements of the parameter, and determining, by the controller, whether a fault exists with respect to the stepper motor based on the comparison of the measurements.

In some embodiments, an apparatus comprises at least one processor, and memory having instructions stored thereon that, when executed by the at least one processor, cause the apparatus to: measure a duty cycle of a pulse width modulation (PWM) associated with a current of a stepper motor prior to commanding a step in connection with the stepper motor, command the step in connection with the stepper motor, measure the duty cycle of the PWM subsequent to commanding the step, compare the measurements of the duty cycle of the PWM, and determine whether a fault exists with respect to the stepper motor based on the comparison of the measurements.

Other embodiments of the disclosure are described below.

BRIEF DESCRIPTION OF THE DRAWINGS

The present disclosure is illustrated by way of example and not limited in the accompanying figures, in which.

DETAILED DESCRIPTION

Figure 1:
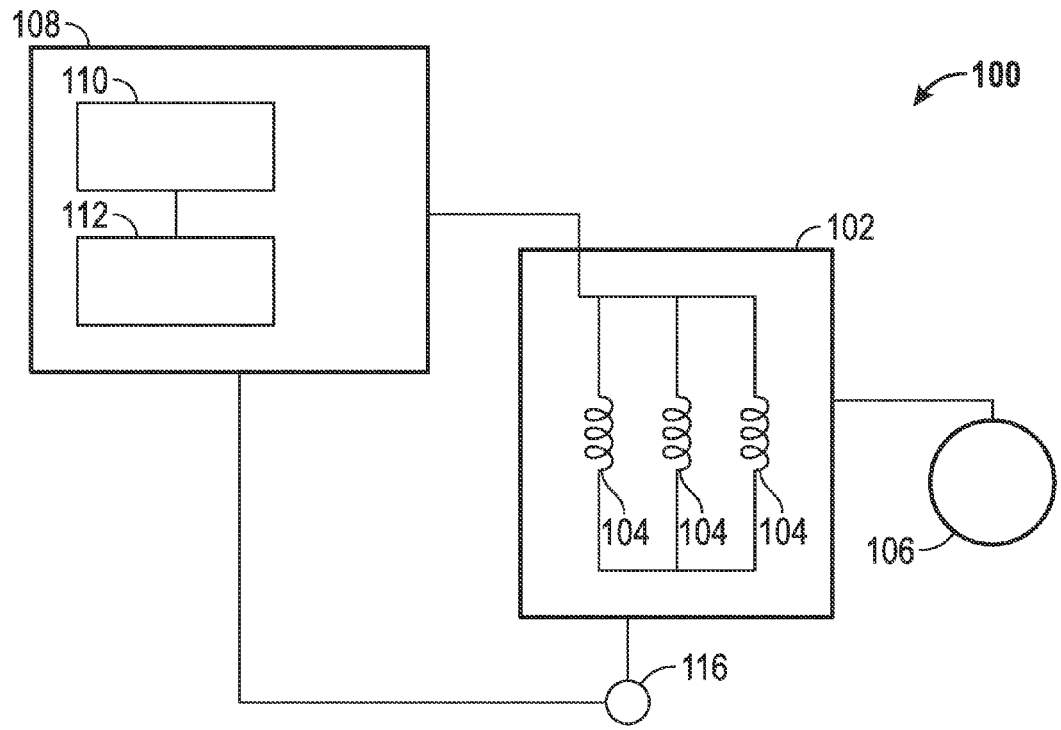
FIG. 1 illustrates an exemplary system in accordance with one or more embodiments of the disclosure.

In accordance with one or more embodiments of the disclosure, a fault associated with a motor may be detected. In contrast to techniques that monitored voltages, embodiments of the disclosure may monitor or control one or more currents, potentially in connection with a pulse width modulation (PWM) function.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this regard, a coupling of entities, components, and/or devices may refer to either a direct connection or an indirect connection.

FIG. 1 illustrates an exemplary fault detection system 100. The system 100 may be associated with one or more applications or environments, such as an aircraft. The system 100 may include one or more motors, such as a motor 102. The motor 102 may be a stepper motor. The motor 102 may include one or more components or devices, such as one or more mechanical and/or electrical components known to those of skill in the art. In some embodiments the motor 102 may include one or more coils, such as coils 104. The system may include one or more power supplies, such as a power supply 106. The motor 102 may be powered by the power supply 106.

The system 100 may include a controller 108. The controller 108 may include any combination of hardware, software, and/or firmware. In some embodiments, the controller 108 may include one or more processors 110, and memory 112 having instructions stored thereon that, when executed by the one or more processors 110, cause the controller 108 to perform one or more methodological acts, such as those described herein. The controller 108 may be coupled to the motor 102 as shown in FIG. 1.

In some embodiments, the controller 108 may be configured to control a current associated with the motor 102. For example, the controller 108 may control the current of a stepper motor based on a pulse width modulation (PWM) function. In some embodiments, an electromagnet or coil 104 may be selectively energized or de-energized to facilitate a step in the motor 102.

When a step in the motor 102 is commanded by the controller 108, a first of the coils 104 might need to de-energize before a second of the coils 104 can be driven or energized. While de-energizing, a current might not flow through a monitor point 116. In some embodiments, the monitor point 116 may correspond to a node associated with, or coupled to, one or more of the coils 104 as shown in FIG. 1. The absence of the current through the monitor point 116 may cause the PWM function to react by increasing a duty cycle. In the event that a coil 104 fails or sustains a fault, there may be no de-energizing period, and accordingly, no increase in the PWM duty cycle. As such, the duty cycle of the PWM function may be monitored to determine whether a fault exists with respect to the motor 102.

The system 100 is illustrative. In some embodiments, one or more of the components or devices may be optional. In some embodiments, one or more additional devices not shown may be included. In some embodiments, the components or devices may be organized or arranged in a manner different from what is shown in FIG. 1.

Figure 2A:
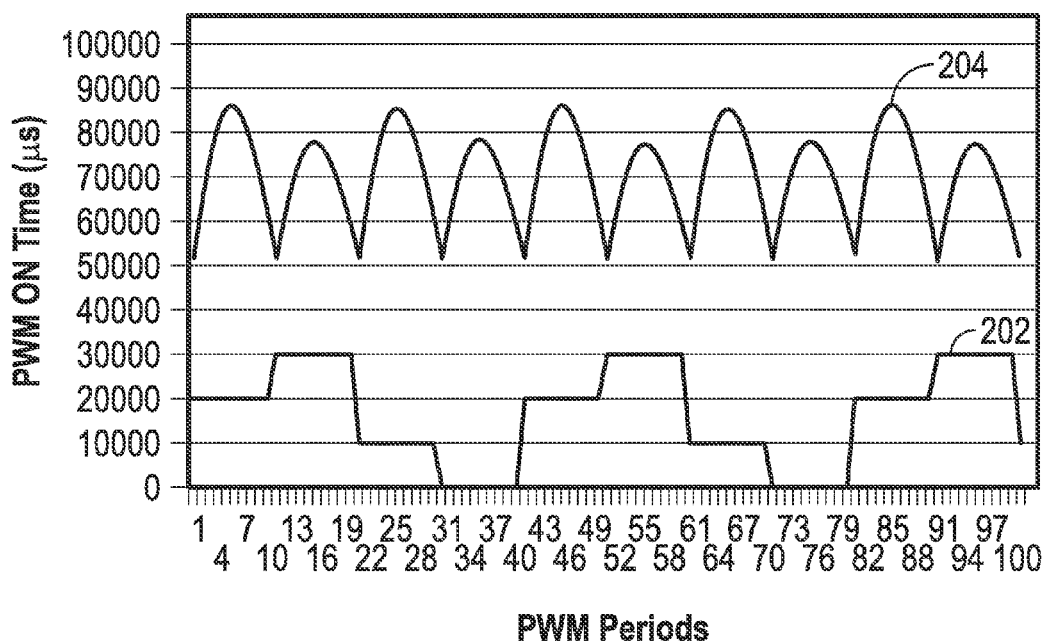
FIGS. 2A-2C illustrate exemplary graphs in accordance with one or more embodiments of this disclosure.
Figure 2B:
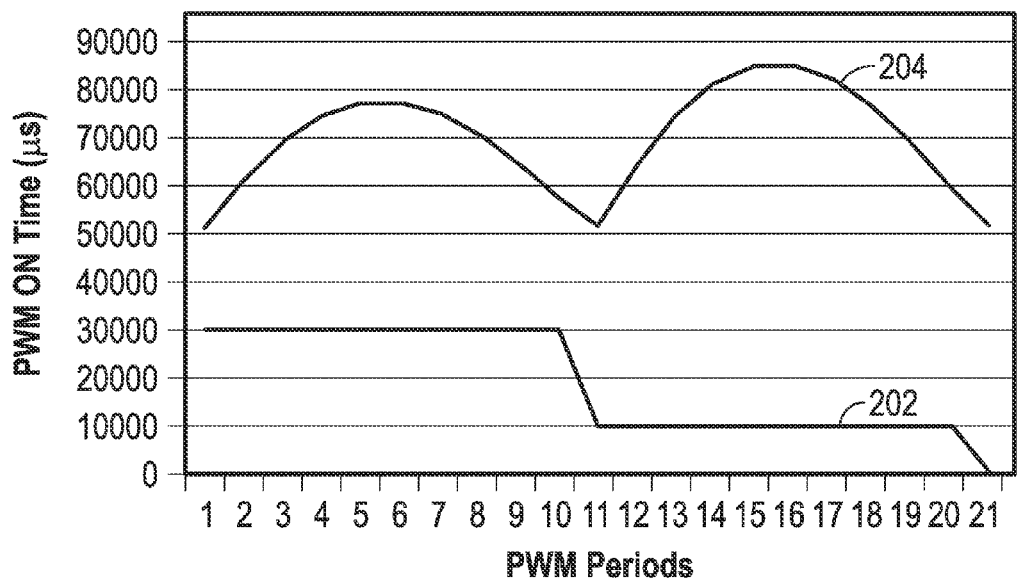
Figure 2C:
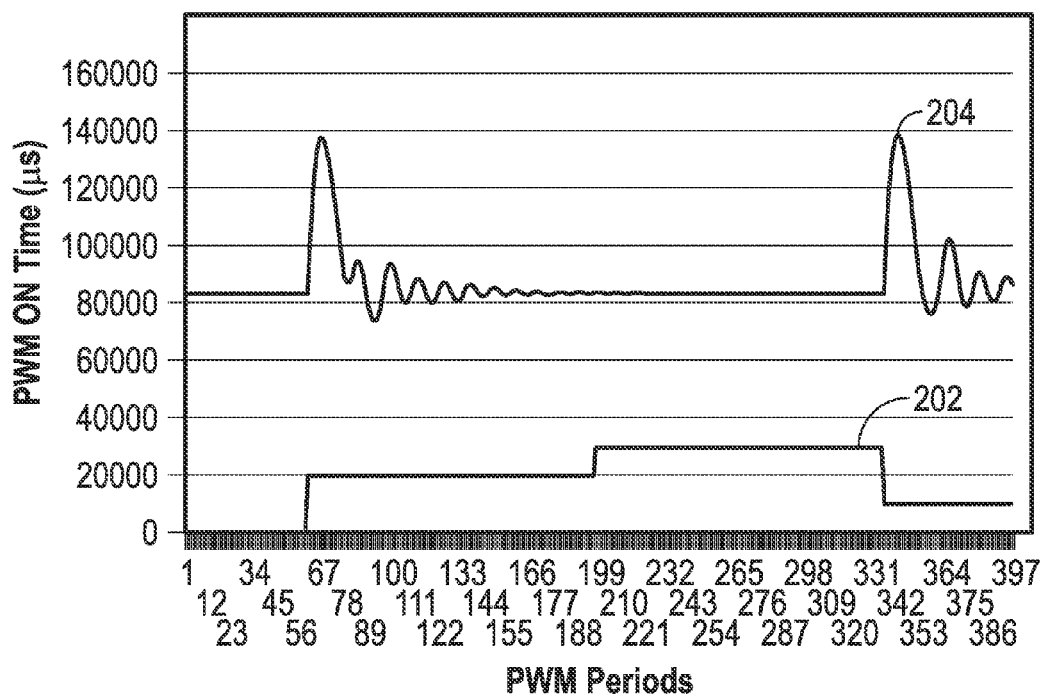

FIGS. 2A-2C illustrate exemplary graphs in accordance with one or more aspects of this disclosure. Each of the graphs of FIG. 2A-2C may depict time counts on the vertical axis relative to sample numbers taken from a logic analyzer on the horizontal axis. As shown in FIGS. 2A-2C, the vertical axis may generally correspond to or include a PWM "on" time as measured in, e.g., microseconds (μs) and may be proportional to a fixed PWM period. The horizontal axis may correspond to PWM periods.

As shown in FIG. 2A, a cycle 202 may be composed of a number of steps. For example, transitions or steps may be included at approximately sample numbers forty-one (41), forty-nine (49), sixty-one (61), and sixty-nine (69). That same pattern of four transitions or steps may repeat itself starting at, e.g., approximately sample number eighty-one (81).

Also shown in FIG. 2A is a plot of the PWM "on" time 204. The PWM on time 204 may correspond to a time that a PWM function is active. The PWM on time 204 may be associated with the cycle 202. For example, FIG. 2B is a graph of an individual step in the cycle 202. As shown in FIG. 2B, the downward step at sample number ten (10) in the cycle 202 may result in a (local) maxima in PWM on time 204 at approximately sample number sixteen (16). The delay between the commanded step and the maxima may be correlated to a loop time of the PWM function.

FIG. 2C illustrates a graph that may be indicative of a fault, such as a broken coil (e.g., a coil 104). For example, in response to steps at approximately sample numbers fifty-six (56) and three-hundred forty-two (342) in the cycle 202, relatively large transients appear in the PWM on time graph 204. Conversely, no such transient appears in the PWM on time graph 204 in response to the step at approximately sample number one-hundred ninety-nine (199) in the cycle 202. The lack of a transient in the PWM on time graph 204 starting at approximately sample number one-hundred ninety-nine (199) may be indicative of a fault.

The values shown in FIGS. 2A-2C are illustrative. In some embodiments, different counts, samples, or frequencies may be used.

Figure 3:
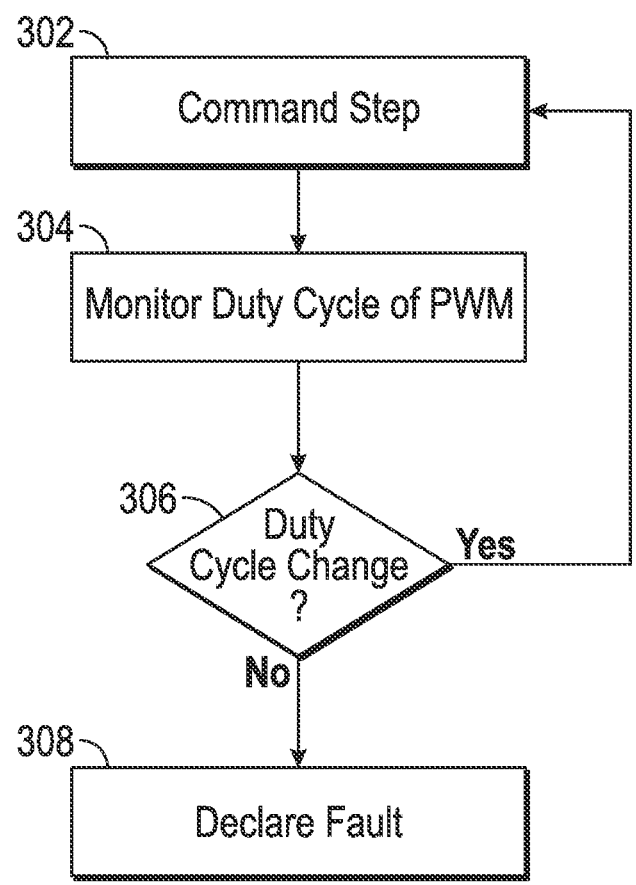
FIG. 3 illustrates an exemplary method in accordance with one or more embodiments of this disclosure.

FIG. 3 illustrates a method in accordance with one or more embodiments of this disclosure. In some embodiments, the method may execute in accordance with one or more systems, components, or devices, such as those described herein. The method of FIG. 3 may be used to detect whether a fault exists with a motor (e.g., the motor 102). The method may be implemented using hardware, software, firmware, or any combination thereof. The method may be implemented using a controller (e.g., the controller 108).

In block 302, a step in a motor may be commanded. The step may correspond to one of a number of steps associated with a full period of rotation of the motor.

In block 304, a duty cycle of a PWM function may be monitored. For example, the duty cycle may be measured. The monitoring of block 304 may be triggered or initiated by the step commanded in block 302.

In block 306, a determination may be made whether the duty cycle of the PWM function changed in block 304 in an amount greater than a threshold, within a threshold amount of time (or samples). If so (e.g., the "Yes" path is taken out of block 306), then flow may proceed to block 302 to prepare for the next step or transition. Otherwise, flow may proceed from block 306 to block 308 (e.g., along the "No" path out of block 306), where a fault associated with the motor (e.g., a failed coil) may be declared.

The blocks or operations shown in FIG. 3 are illustrative. In some embodiments, some of the operations (or portions thereof) may be optional. In some embodiments, additional operations not shown may be included. In some embodiments, the operations may execute in an order or sequence different from what is shown.

Embodiments of the disclosure may be used to detect a fault associated with a motor (e.g., a fault associated with a coil of the motor) within a number (e.g., four) steps. Aspects of the disclosure may allow for a faster detection of the fault relative to prior solutions. Such earlier/faster detection may be used to maintain dynamics of fuel flow. For example, in embodiments where multiple or redundant channels are available, a switch-over from a failed channel (e.g., a motor with a fault) to a healthy channel (e.g., a motor without a fault) may take place sooner.

In some embodiments various functions or acts may take place at a given location and/or in connection with the operation of one or more apparatuses or systems. In some embodiments, a portion of a given function or act may be performed at a first device or location, and the remainder of the function or act may be performed at one or more additional devices or locations. Aspects of the disclosure may be directed to one or more systems, apparatuses, and methods. In some embodiments, executable instructions may be stored on one or more media, such as a non-transitory computer readable medium. The instructions, when executed, may cause an entity to perform one or more methodological acts.

Aspects of the disclosure may be tied to particular machines. For example, in some embodiments a device or entity, such as a controller, may monitor a duty cycle of a PWM function to determine whether a motor (or coil associated with the motor) has sustained a fault.

Aspects of the disclosure have been described in terms of illustrative embodiments thereof. Numerous other embodiments, modifications and variations within the scope and spirit of the appended claims will occur to persons of ordinary skill in the art from a review of this disclosure.

What is claimed is:

1. A system comprising:
 a stepper motor; and
 a controller configured to:
  measure a parameter associated with a current of the stepper motor prior to commanding a step in connection with the stepper motor, wherein the step corresponds to one of a plurality of steps associated with a full period of rotation of the stepper motor,
  command the step in connection with the stepper motor,
  measure the parameter subsequent to commanding the step,
  compare the measurements of the parameter, and
  determine whether a fault exists with respect to the stepper motor based whether the comparison of the measurements indicated a change in an amount greater than a threshold, within a threshold amount of time.

2. The system of claim 1, wherein the parameter comprises a duty cycle of a pulse width modulation (PWM).

3. The system of claim 2, wherein the controller is configured to:
 compare the measurements of the parameter by monitoring the duty cycle of the PWM to determine whether the duty cycle changes in the amount greater than the threshold in response to the commanded step.

4. The system of claim 3, wherein the controller is configured to declare that a fault exists with respect to a coil included in the stepper motor based at least in part on the duty cycle not changing in the amount greater than the threshold.

5. The system of claim 3, wherein the controller is configured to declare that a fault exists with respect to a coil included in the stepper motor based on the duty cycle not changing in the amount greater than the threshold within a threshold amount of time.

6. The system of claim 1, wherein the system is associated with an aircraft.

7. The system of claim 1, wherein the controller is configured to cause a switch from the stepper motor to a second stepper motor responsive to determining that a fault exists with respect to the stepper motor.

8. The system of claim 1, wherein a coil of the stepper motor may be selectively de-energized to facilitate a step in the stepper motor, and
wherein a current does not flow through a monitor point during the de-energizing.

9. The system of claim 1, wherein a first of a plurality of coils of the stepper motor is de-energize before a second of the plurality of coils is energized when the step is commanded.

10. A method comprising:
measuring, by a controller, a parameter associated with a current of a stepper motor prior to commanding a step in connection with the stepper motor, wherein the step corresponds to one of a plurality of steps associated with a full period of rotation of the stepper motor;
commanding, by the controller, the step in connection with the stepper motor;
measuring, by the controller, the parameter subsequent to commanding the step;
comparing, by the controller, the measurements of the parameter; and
determining, by the controller, whether a fault exists with respect to the stepper motor based on whether the comparison of the measurements indicated a change in an amount greater than a threshold, within a threshold amount of time.

11. The method of claim 10, wherein the parameter comprises a duty cycle of a pulse width modulation (PWM).

12. The method of claim 11, further comprising:
compare the measurements of the parameter by monitoring, by the controller, the duty cycle of the PWM to determine whether the duty cycle changes in the amount greater than the threshold in response to the commanded step.

13. The method of claim 12, further comprising:
declaring, by the controller, that a fault exists with respect to a coil included in the stepper motor based at least in part on the duty cycle not changing in the amount greater than the threshold.

14. The method of claim 12, further comprising:
declaring, by the controller, that a fault exists with respect to a coil included in the stepper motor based on the duty cycle not changing in the amount greater than the threshold within a threshold amount of time.

15. The method of claim 10, further comprising:
switching, by the controller, from the stepper motor to a second stepper motor responsive to determining that a fault exists with respect to the stepper motor in order to maintain dynamics associated with a fuel flow.

16. An apparatus comprising:
at least one processor; and
memory having instructions stored thereon that, when executed by the at least one processor, cause the apparatus to:
measure a duty cycle of a pulse width modulation (PWM) associated with a current of a stepper motor prior to commanding a step in connection with the stepper motor, wherein the step corresponds to one of a plurality of steps associated with a full period of rotation of the stepper motor,
command the step in connection with the stepper motor,
measure the duty cycle of the PWM subsequent to commanding the step,
compare the measurements of the duty cycle of the PWM, and
determine whether a fault exists with respect to the stepper motor based whether the comparison of the measurements indicated a change in an amount greater than a threshold, within a threshold amount of time.

17. The apparatus of claim 16, wherein the instructions, when executed by the at least one processor, cause the apparatus to:
compare the measurements of the duty cycle of the PWM by monitoring the duty cycle of the PWM to determine whether the duty cycle changes in the amount greater than the threshold in response to the commanded step.

18. The apparatus of claim 17, wherein the instructions, when executed by the at least one processor, cause the apparatus to:
declare that a fault exists with respect to a coil included in the stepper motor based at least in part on the duty cycle not changing in the amount greater than the threshold.

19. The apparatus of claim 17, wherein the instructions, when executed by the at least one processor, cause the apparatus to:
declare that a fault exists with respect to a coil included in the stepper motor based on the duty cycle not changing in the amount greater than the threshold within a threshold amount of time.

20. The apparatus of claim 19, wherein the threshold amount of time is correlated to a number of samples.

* * * * *